March 21, 1944.    N. VALLINOS    2,344,794
COMBINATION FLOWERPOT AND JARDINIERE
Filed March 22, 1943

Inventor:
Nicholas Vallinos
by Louis Shumacher
Atty.

Patented Mar. 21, 1944

2,344,794

UNITED STATES PATENT OFFICE 2,344,794

COMBINATION FLOWERPOT AND JARDINIERE

Nicholas Vallinos, New York, N. Y.

Application March 22, 1943, Serial No. 480,103

1 Claim. (Cl. 47—34)

This invention relates to devices such as combination flower pots and jardinieres.

One object of the invention is to provide a device as set forth whereby the life of a plant may be prolonged by a more uniform feed and better conservation of water available therefor.

More specifically it is an object of the invention to reduce evaporation of water through the porous portions of a flower pot and desirably to also provide and maintain a reservoir of water, by conjoint improved operation of the jardiniere and its removable flower pot, whereby the destruction of fine fibrous roots during dry heat spells is avoided.

Another object of the invention is the provision of a device as described whereby a plant may be planted and retained throughout in the flower pot specifically provided for the jardiniere, thus avoiding laborious transplanting.

To appreciate the importance of the advantages involved, it is necessary to bear in mind that a horticulturist places plants in unglazed pots, because such pots afford various advantages in handling and growing the plant, especially as the plant is often transplanted to successively larger pots in course of the development of the plant. Such unglazed pots are, however, undesirable for use by the ordinary consumer, particularly because the loss of water by evaporation therefrom is very rapid. Unless extreme care and attention are given, the fine, fibrous roots are readily damaged especially during a hot, dry spell of weather. Therefore transplanting to glazed pots is almost the universal rule. My invention saves all this labor of transplanting because I provide for the initial planting directly into my novel pot. When sold to the ultimate consumer, this novel pot need merely be placed in a jardiniere provided according to the invention, thus creating my device, and reducing loss of water by evaporation and affording a reservoir, all for the efficient feed and control of water to the plant.

Another object of the invention is to provide a device of the character described which is convenient in use, cheap to manufacture, and whose outside appearance is neat and is like that of a single glazed pot, although water may be supplied to the roots directly or by absorption through porous, unglazed walls.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated on the annexed drawing, wherein like parts are designated by the same reference characters throughout the several views.

Figure 1:
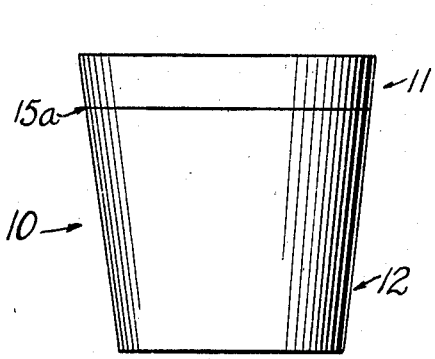
Figure 1 is a side view of a device embodying the invention.
Figure 2:
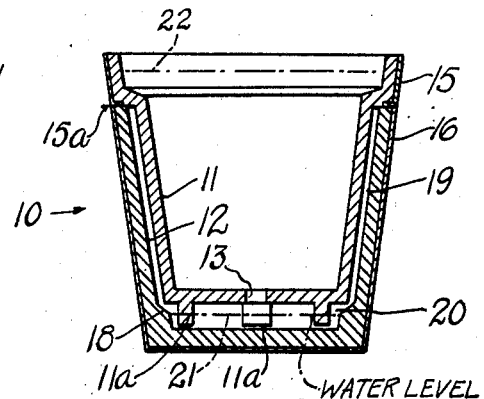
Fig. 2 is a central sectional view thereof.
Figure 3:
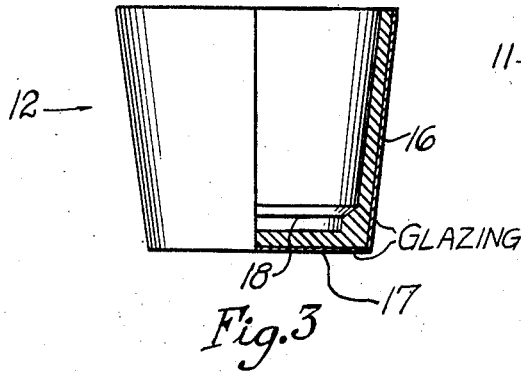
Figs. 3 and 4 are views partly in section and partly in elevation, of a jardiniere and flower pot respectively.
Figure 4:
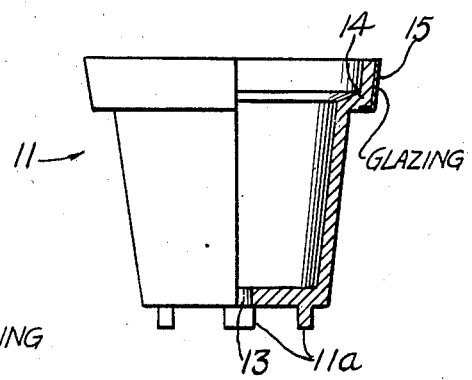

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device embodying the invention. The same comprises a flower pot 11 and a jardiniere 12. The former may have a usual drain hole 13 and an upper annular shoulder 14, glazed as at 15. Preferably all the rest of the pot is unglazed and porous for absorption of water, which may be aided by the feet or projections 11a at the bottom wall of the pot.

The jardiniere 12 has a non porous side and bottom wall, such as may be produced by glazing as at 16, 17. It may also have an annular corner reenforcement constituting a water control means 18 as hereinafter described.

When the flower pot is placed in the jardiniere, the assembly is complete. The shoulder 14 may rest on the top edge of the jardiniere forming a joint 15a, closing off an annular chamber 19 and also a bottom chamber 20. A fairly accurate fit prevents loss of water by evaporation, since the outside of the device 10 is non porous, because the glazing at 15, 16, 17 is practically continuous throughout. The level of water in the reservoir may be indicated at 21 and this may be at the level of the bottom of the pot 11. If desired the pot may also rest on or closely approach the shoulder 18, so that the latter forms a restriction, and the space forming chamber 19 may be so narrow that water may creep up into it by capillary action. The feet 11a dip into the water but are not intended to rest on the jardiniere. The water at 21 may be supplied by drainage through the opening 13 or it may be poured directly into the jardiniere. The water level may be checked from time to time by removal of the pot 11.

When the quantity of water in the earth in the pot 11 is removed by evaporation at the mouth of the pot and absorption by the plant, moisture may be absorbed from the jardiniere to avoid injury to delicate fibrous roots. Such absorption may be aided by the porous feet 11a, especially if the water level be rather low, but the loss of water by evaporation at the top of the pot will be rather inconsequential, as the earth level is sufficiently high, as indicated at 22, to assure absorption to the plant.

It is now clear that a plant can be initially placed in the porous flower pot 11 which may be sunk into loose earth and kept there without transplanting, this pot being placed in the jardiniere 12 to produce the complete device 10 sold to a customer. The life of the plant is prolonged by avoiding evaporation from the porous wall of the pot, and the elimination of transplanting avoids considerable labor and possible damage to the plant which would be especially serious at the time of sale to a customer. The device 10 is easy to use, cheap to make and is neat in appearance as shown by Fig. 1, and it may be embodied in various different designs and shapes, and combinations thereof, or may be made to look like a single structure.

The device 10 may be made by casting the pot and jardiniere of usual porous materials, which may be baked hard. Then suitable fusible material may be applied to the outside of the shoulder portion of the pot and to the outside of the jardiniere, these articles being then heated to produce the glazing indicated. The large mass of porous material of the pot and jardiniere affords a substantial water capacity, which has the advantage as compared with the reservoir 20, that it yields its water very slowly. It creates at the very least a highly humid atmosphere within the chamber 19; the large external porous surface of the pot being well adapted to absorb moisture therefrom. Thus the reservoir may be dry, and yet some moisture is available to tide the plant over and prevent destruction of the delicate root ends. The aforementioned action may be enhanced by utilizing relatively coarse material in making the pot and jardiniere, this being feasible because the coarseness is concealed by the decorative glazing. If preferred, the joint 15a may be regarded as temporarily sealed by any suitable gummy or other material, and of course the water may be supplied to the pot as by a measuring cup, to obtain a uniform feed as determined by user and in accordance with the requirements of the particular plant. Since the pot is carried entirely at the joint 15a, a good closure is obtainable without such obstruction as might be caused by irregularities as might be the case with a multi point support, particularly as the structure is cast and hence may be varied somewhat in size. Here the entire weight of the pot is available to assure a proper closure, and the difficulty generally experienced in fitting together ordinary pots and jardinieres is avoided.

I claim:

A combined flower pot and jardiniere, including a pot having an annular outwardly offset shoulder portion at the mouth thereof defining a band-like part forming the upper portion of the pot, and a jardiniere receiving said pot and supporting the same at the bottom of the shoulder portion, the pot consisting substantially of porous material with the band-like part thereof being externally non porous and the rest of the pot below said part being externally and internally porous to water, the jardiniere consisting substantially of porous material with the external surface thereof non porous and the internal surface thereof porous to water, the external surface of the pot below the shoulder portion being spaced from the internal surface of the jardiniere to afford a water and moisture chamber in communication with the pot, said porous materials affording water storage capacity with water in said chamber being absorbed and distributed at the porous surfaces and by the porous materials, said chamber being closed by the shoulder portion constituting a closure therefor and the non porous surfaces of the pot and jardiniere being substantially continuous with each other, the non-porous surface portions of the band-like part and of the side wall of the pot lying in a single continuous upright surface.

NICHOLAS VALLINOS.